United States Patent
Bommer et al.

(10) Patent No.: US 9,421,950 B2
(45) Date of Patent: Aug. 23, 2016

(54) WIPER BLADE FOR THE CLEANING OF VEHICLE WINDOWS

(71) Applicant: Valeo Wischersysteme GmbH, Bietigheim-Bissingen (DE)

(72) Inventors: Jürgen Bommer, Tamm (DE); Michael Buss, Illingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 50 days.

(21) Appl. No.: 14/348,779

(22) PCT Filed: Sep. 24, 2012

(86) PCT No.: PCT/EP2012/068764
§ 371 (c)(1),
(2) Date: Mar. 31, 2014

(87) PCT Pub. No.: WO2013/045392
PCT Pub. Date: Apr. 4, 2013

(65) Prior Publication Data
US 2014/0230174 A1    Aug. 21, 2014

(30) Foreign Application Priority Data

Sep. 30, 2011  (DE) .................. 10 2011 054 123

(51) Int. Cl.
*B60S 1/04*    (2006.01)
*B60S 1/52*    (2006.01)
*B60S 1/38*    (2006.01)

(52) U.S. Cl.
CPC .............. *B60S 1/3879* (2013.01); *B60S 1/381* (2013.01); *B60S 1/3851* (2013.01); *B60S 1/3881* (2013.01); *B60S 1/524* (2013.01); B60S 2001/3822 (2013.01); B60S 2001/3836 (2013.01)

(58) Field of Classification Search
CPC ................ B60S 1/3879; B60S 1/3856; B60S 2001/3817; B60S 2001/3825; B60S 1/3881; B60S 1/524

USPC .......................................... 15/250.32, 250.34
See application file for complete search history.

(56) References Cited

U.S. PATENT DOCUMENTS 2,968,828 A * 1/1961 Horton .................. B60S 1/3801
15/245
3,006,018 A * 10/1961 Golab .................. B60S 1/3801
15/250.43

(Continued)

FOREIGN PATENT DOCUMENTS

DE         10350274 A1    9/2004
DE      202006004584 U1    8/2007

(Continued)

OTHER PUBLICATIONS

International Search Report issued in PCT/EP2012/068764 mailed on Nov. 12, 2012 (3 pages).

(Continued)

*Primary Examiner* — Michael Jennings
(74) *Attorney, Agent, or Firm* — Osha Liang LLP

(57) ABSTRACT

The invention relates to a wiper blade (10) for the cleaning of vehicle windows, with a wiper blade body (12), which is able to be connected to a wiper arm (1) via preferably a wiper blade adapter (11) arranged approximately centrally on the wiper blade body (12), wherein the wiper blade body (12) has a wiper rubber (13) with a wiper lip (14), and wherein a receiving groove (16, 17) which is U-shaped in cross section is formed and in which a strip-shaped spring strip (18, 19) engages in the wiper rubber (13) on both longitudinal sides lying opposite each other. According to the invention, it is provided that the two spring strips (18, 19) are rigidly connected to each other by means of at least one reinforcing element (25), wherein the reinforcing element (25) engages over the wiper blade body (12) on the side facing away from the wiper lip (14) and is connected at least indirectly to the two spring strips (18, 19).

5 Claims, 3 Drawing Sheets

(56) References Cited

U.S. PATENT DOCUMENTS

Figure 1:
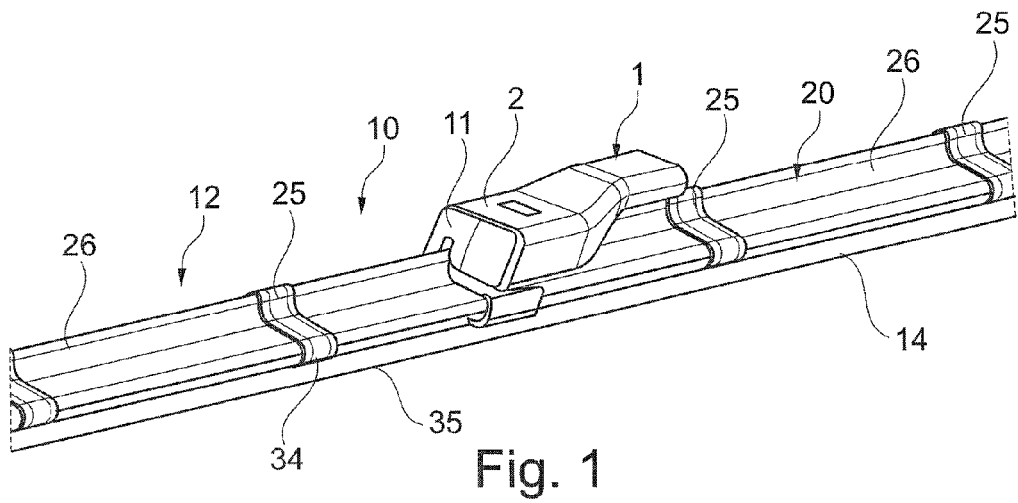

| | | | | |
|---|---|---|---|---|
| 3,885,265 | A * | 5/1975 | Deibel | B60S 1/3801 15/250.452 |
| 4,658,463 | A * | 4/1987 | Sugita | B60S 1/38 15/250.452 |
| 6,634,055 | B1 * | 10/2003 | De Block | B60S 1/3858 15/250.32 |
| 7,540,062 | B1 | 6/2009 | Huang | |
| 2008/0078051 | A1 * | 4/2008 | Herring | B60S 1/3851 15/250.001 |
| 2008/0216274 | A1 * | 9/2008 | Egner-Walter | B60S 1/524 15/250.02 |
| 2008/0263806 | A1 * | 10/2008 | Egner-Walter | B60S 1/386 15/250.01 |
| 2009/0172907 | A1 * | 7/2009 | Egner-Walter | B60S 1/524 15/250.01 |
| 2009/0178226 | A1 * | 7/2009 | Lee | B60S 1/381 15/250.32 |
| 2010/0218332 | A1 * | 9/2010 | Stankiewicz | B60S 1/381 15/250.201 |
| 2010/0242204 | A1 | 9/2010 | Chien | |

FOREIGN PATENT DOCUMENTS

| | | | |
|---|---|---|---|
| DE | 102008012464 A1 | 9/2009 | |
| DE | 10 2009 017990 A1 | 10/2010 | |
| EP | 1 918 167 A1 | 5/2008 | |
| WO | WO 2008147849 A1 * | 12/2008 | ............ B60S 1/3879 |
| WO | 2011/080885 A1 | 7/2011 | |

OTHER PUBLICATIONS

German Search Report issued in Application No. 10 2011 054 123.3 mailed on May 14, 2012 (2 pages).

* cited by examiner

WIPER BLADE FOR THE CLEANING OF VEHICLE WINDOWS

PRIOR ART

The invention relates to a wiper blade for the cleaning of vehicle windows according to the precharacterizing clause of claim 1.

A wiper blade of this type is generally already known in practice, wherein the wiper rubber of said wiper blade is reinforced by two strip-shaped spring strips which are arranged in wiper rubber receiving grooves, which are U-shaped in cross section. The spring strips furthermore serve to produce a contact pressure, which is uniform over the length of the wiper blade, against the vehicle window, which is customarily of curved design. Furthermore, in the case of the known wiper blades, it is known to close or to cover the end sides of the wiper blades by means of end caps consisting of plastic, wherein the end caps at the same time also connect the two spring strips to each other.

Furthermore, it is known from the prior art to use elements which consist of plastic and embrace the wiper blade body on the side facing away from the wiper lip of the wiper rubber and press the spring strips in the direction of the receiving grooves. It is therefore intended to be ensured that the spring strips are always arranged in the desired manner in the receiving grooves and do not drop out of the receiving grooves during operation.

It has proven problematic in practice that such wiper blades or wiper blade bodies which are provided with two spring strips have a relatively high moment of resistance (caused by the rectangular cross section of the spring rail) in the plane of the spring strips in the direction perpendicular to the direction of extension thereof, but the wiper blade body, as seen as a whole, has a tendency to twist, since the wiper blade body can rotate or twist relatively easily in a torsion axis running between the two spring strips within the wiper rubber. This causes a deterioration in the functional properties of the wiper blade.

DISCLOSURE OF THE INVENTION

Starting from the presented prior art, the invention is based on the object of developing a wiper blade for the cleaning of vehicle windows according to the precharacterizing clause of claim 1 in such a manner that the torsional resistance thereof is increased in a torsion axis running between the two spring strips within the wiper rubber. In addition, the tendency of the spring strips to be deformed in a sickle-shaped manner, causing the spring strips to rotate out of the mounts thereof, is intended to be reduced. This object is achieved in the case of a wiper blade according to the invention for the cleaning of vehicle windows with the features of claim 1 in that the two spring strips are rigidly connected to each other by means of at least one reinforcing element, wherein the reinforcing element engages over the wiper blade body on the side facing away from the wiper lip and is connected at least indirectly to the two spring strips. In other words, this means that the two spring strips are mechanically coupled to each other by the at least one reinforcing element, thus producing an assembly which, in comparison to two spring strips which are not connected to each other and each have a certain moment of area, forms a greater moment of area by comparison thereto, said moment of area resulting, inter alia, in a torsional resistance which is increased with respect to a torsion axis running parallel to the spring strips.

Advantageous developments of the wiper blade according to the invention for the cleaning of vehicle windows are cited in the dependent claims. The scope of the invention includes all combinations of at least two features disclosed in the claims, the description and/or the figures.

In order, firstly, to keep the material requirements of the reinforcing elements as low as possible and, secondly, to make it possible for the reinforcing elements to emerge as little as possible (in an interfering manner) from the wiper blade body, it is proposed that the reinforcing element has mounts, which are U-shaped in cross section, for the spring strips, which embrace the spring strips on the sides lying opposite the receiving grooves of the wiper rubber, preferably by a clamping fit.

The reinforcing elements can be produced in an economically advantageous manner and with the required accuracy when said reinforcing elements consist of plastic and are constructed as an injection moulded part.

In a further advantageous refinement of the invention, it is provided that the wiper blade body forms a spoiler element on the side facing away from the wiper lip, and that the cross section of the reinforcing element is adapted to the cross section of the wiper blade body or of the spoiler element.

The torsional resistance of the wiper blade body can be improved by the use of a plurality of reinforcing elements. It is therefore proposed, in a further, particularly preferred refinement of the invention, that at least one reinforcing element is arranged in each case on both sides of the wiper blade adapter.

In order to permit the use of the reinforcing elements even in the case of what are referred to as "Aqua Blade" wiper blades, in which a washing fluid duct is conventionally formed in the wiper blade body on each of the longitudinal sides of the wiper blade body, it is furthermore proposed that the reinforcing element has at least one through-bore for a washing fluid, said through-bore extending parallel to the wiper blade body and being connected by means of at least one connecting piece to a washing fluid duct preferably constructed in the spoiler element.

In a further, particularly preferred alternative of the last-mentioned refinement, it is proposed that the reinforcing element has at least one spray opening for the washing fluid, which is connected to the through-bore. This creates the possibility of dispensing with the formation of separate spray openings in the spoiler element (or, for example, in the wiper rubber), said spray openings being relatively expensive to produce because of the separate machining process required for this purpose.

Should it be desired, depending on the application, additionally to increase the torsional resistance of the wiper blade body, it is proposed that an additional reinforcing element is provided, preferably constructed as a spring strip, which connects the wiper blade adapter to the reinforcing element in a form-fitting manner.

An additional reinforcing element of this type can be integrated in a particularly simple manner in the wiper blade body if said reinforcing element is arranged on the upper side of the wiper rubber.

It is preferably provided, for the compact arrangement of the additional reinforcing element and for the unambiguous positioning thereof in the wiper blade body, for the additional reinforcing element to be received in a mount of the reinforcing element, and for the additional reinforcing element to be positioned by a form-fitting connection to the wiper blade adapter in the longitudinal direction of the wiper blade body.

Figure 2:
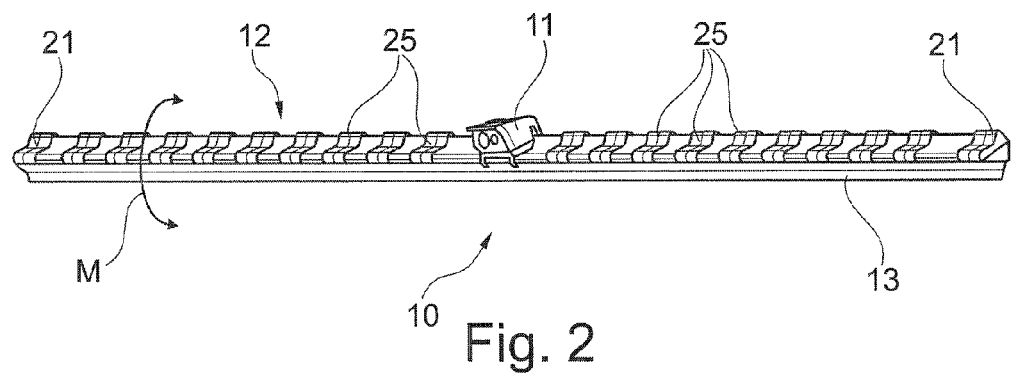
Figure 3:
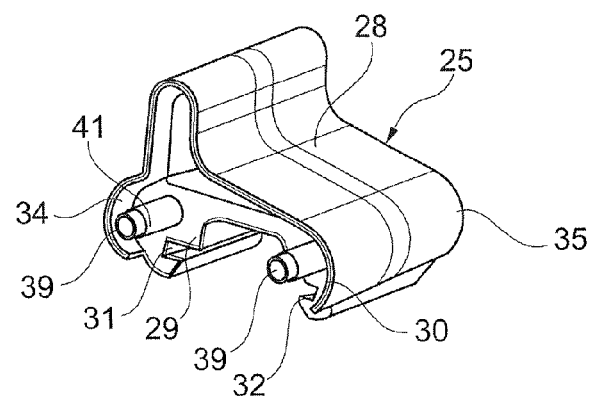
Figure 4:
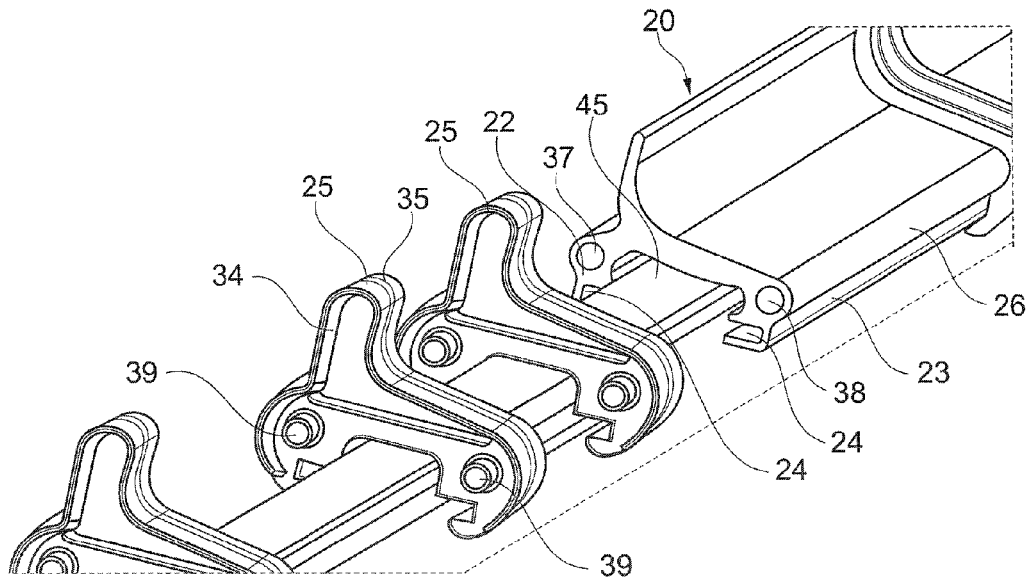
Figures 5, 8:
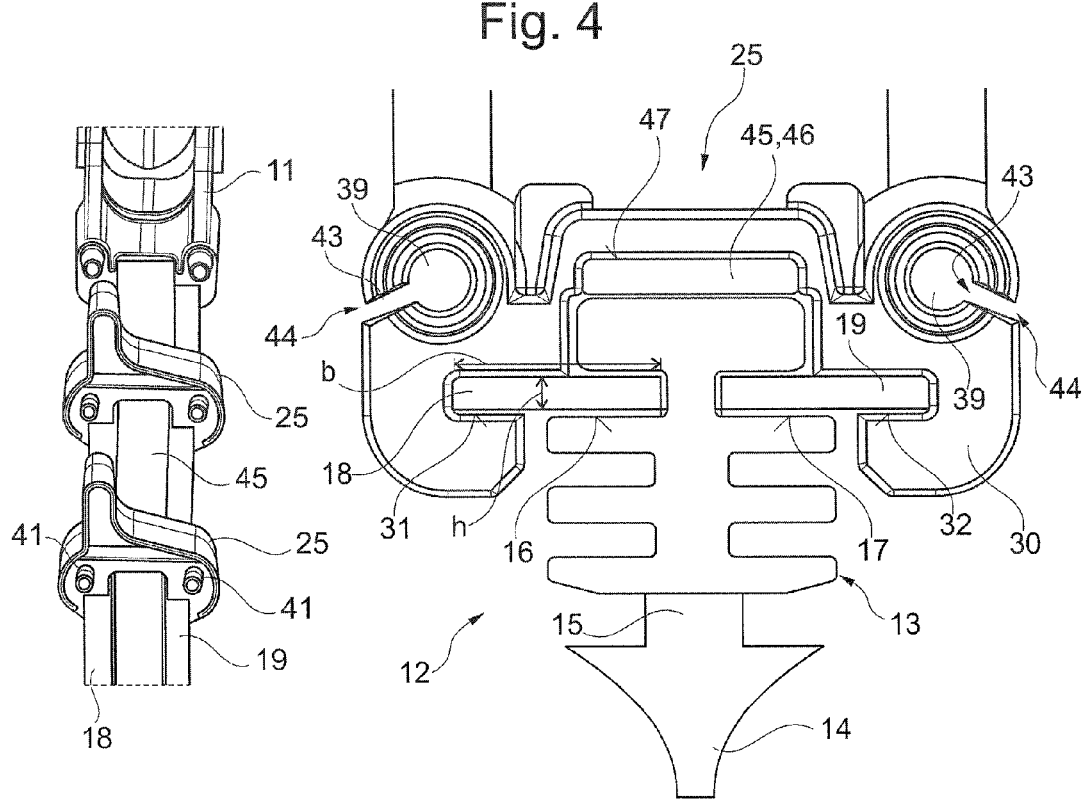
Figure 6:
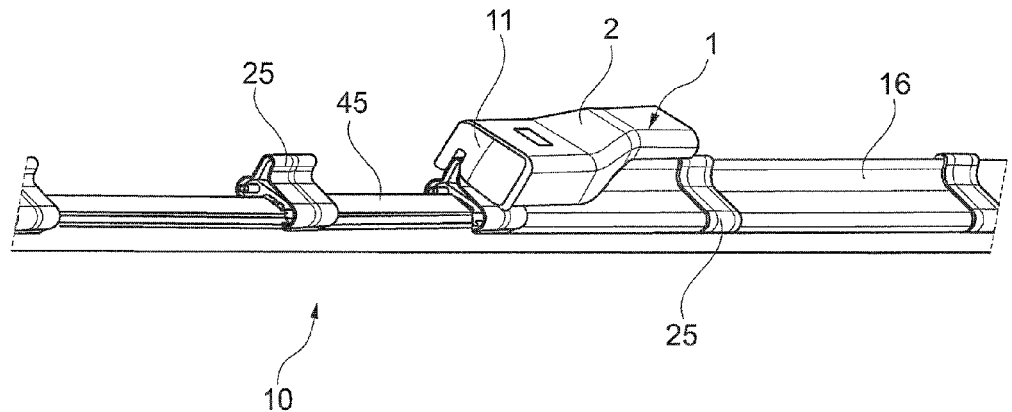
Figure 7:
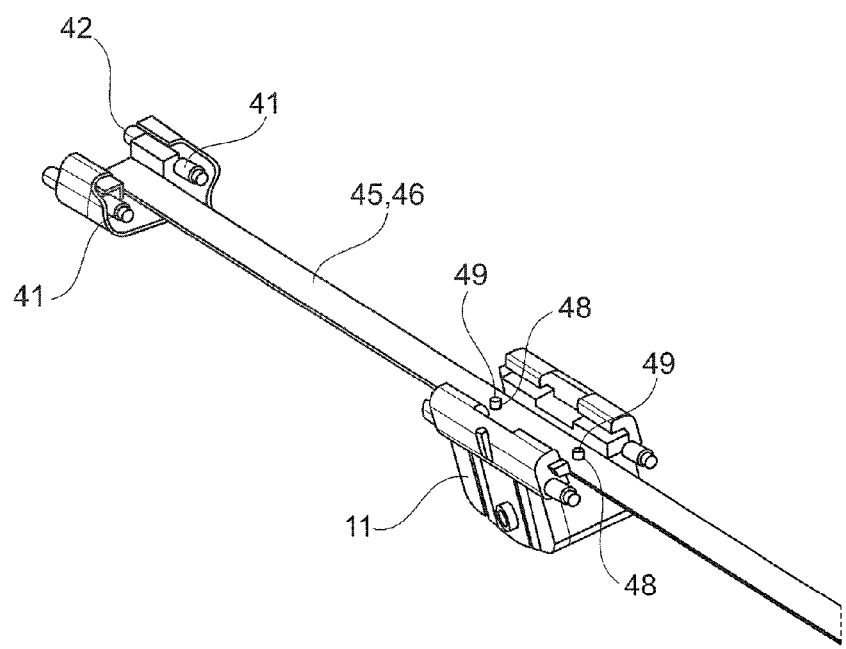

Further advantages, features and details of the invention emerge from the description below of preferred exemplary embodiments and with reference to the drawing, in which:

FIG. 1 shows a perspective view of a partial region of a wiper blade according to the invention, FIG. 2 shows a perspective view of a wiper blade which is modified by comparison to FIG. 1 with the use of a multiplicity of reinforcing elements, FIG. 3 shows a perspective illustration of a reinforcing element used in a wiper blade according to FIG. 1 or 2, FIG. 4 shows a perspective view of a partial region of a wiper blade according to the invention with the use of a strip-shaped spring strip as an additional reinforcing element, FIG. 5 shows an illustration of the wiper blade according to FIG. 4 in a perspective illustration without the wiper rubber and wiper blade spoiler thereof, FIG. 6 shows a perspective view of an illustration of the wiper blade according to FIGS. 4 and 5 for explaining the arrangement of the wiper blade adapter, FIG. 7 shows a view from below of a wiper blade adapter and a reinforcing element together with an additional reinforcing element, and FIG. 8 shows a cross section through a wiper blade according to the invention with the use of an additional reinforcing element.

Identical components and components having the same function are provided with the same reference numbers in the figures.

FIG. 1 illustrates a partial region of a wiper blade 10 according to the invention for the cleaning of vehicle windows. The wiper blade 10 is connected to a window wiper drive by means of a wiper arm 1, only part of which is illustrated in FIG. 1. In order to fasten the wiper blade 10 to the wiper arm 1, use is made of a wiper blade adapter 11 of the wiper blade 10, said wiper blade adapter preferably being arranged in the central region of the wiper blade 10 and being connected, preferably by a latching connection, to a connecting region 2, which is in particular U-shaped in cross section, of the wiper arm 1. Such a latching connection serves to fasten the wiper blade 10 interchangeably to the wiper arm 1 and is known in a varied manner from the prior art.

In addition to the wiper blade adapter 11, the wiper blade 10 essentially has a wiper blade body 12 which is preferably covered on the two opposite end sides thereof by means of end caps 21, which can only be seen in FIG. 2. As is apparent from looking at FIGS. 1 and 8 together, the wiper blade body 12 has a wiper rubber 13 which is produced in particular by extrusion and forms a wiper lip 14 on the side facing the vehicle window. As is known from the prior art, the wiper lip 14 is connected to the wiper rubber 13 via a tilting web 15.

The wiper rubber 13 has a receiving groove 16, 17 which is U-shaped in cross section on both opposite longitudinal sides thereof. A strip-shaped spring strip 18, 19 is arranged within the respective receiving groove 16, 17 and protrudes laterally out of the receiving groove 16, 17. The spring strips 18, 19 which are produced as punched parts from sheet metal and are customarily provided with a curvature in the longitudinal direction thereof each have a rectangular cross section with a width b and a height h. In practice the width b is much greater, for example at least five times greater, than the height h. On the upper side of the wiper blade body 12, the latter has a wiper blade spoiler 20 which is designed, for example, as a separate component.

The wiper blade spoiler 20 preferably consists of plastic and is produced by extrusion, or alternatively as an injection moulded part. As is also visible in particular from FIG. 4, the wiper blade spoiler 20 has, on both longitudinal sides thereof, a respective arm 22, 23 which embraces the wiper blade body 11 in the region of the spring strips 18, 19 and has mounts 24, which are U-shaped in cross section and, in turn, embrace those lateral sections of the spring strips 18, 19 which protrude from the receiving groove 16, 17.

According to the invention, it is provided that the wiper blade body 12 is reinforced by means of at least one clip-shaped reinforcing element 25, wherein the reinforcing element 25 serves as the mechanical coupling of the two spring strips 18, 19. A refinement of the invention is preferred, in which the wiper blade 10 has at least one reinforcing element 25 on both opposite sides of the wiper blade adapter 11 on each side of the wiper blade body 12, but particularly preferably has a plurality of reinforcing elements 25 in each case.

The reinforcing elements 25 preferably consist of plastic and are designed as injection moulded parts. As can best be seen by looking at FIGS. 1, 3 and 4 together, the reinforcing element 25 substantially has a cross sectional shape which corresponds to the cross section of the wiper blade spoiler 20 or is adapted to said cross section. An arrangement of the reinforcing elements 25 between individual subsegments 26 of the wiper blade spoiler 20 is preferred, wherein the subsegments 26 preferably may each have the same lengths, but may also differ in length. The reinforcing element 25 has a connecting region 28 which is arranged above the wiper rubber 13 and from which respective retaining arms 29, 30 emerge toward the spring strips 18, 19. A mount 31, 32, which is U-shaped in cross section, is formed on each of the two retaining arms 29, 30, on the side facing the spring strip 18, 19, the mount substantially corresponding to the mount 24 of the wiper blade spoiler 20. The two mounts 31, 32 of a reinforcing element 25 embrace those lateral sections of the spring rails 18, 19 which protrude out of the receiving grooves 16, 17 in a form-fitting manner, preferably with a clearance fit.

Owing to the fact that, by means of the reinforcing element 25, the two spring rails 18, 19 are connected in a mechanically rigid manner to each other, the torsional resistance of the arrangement consisting of the two spring rails 18, 19 is increased when a torque M is introduced in a manner corresponding to the double arrow in FIG. 2 about a longitudinal axis of the wiper blade body 12.

Furthermore, in order to permit transitions, which are in each case as gap-free as possible, between the reinforcing elements 25 and the subsegments 26 of the wiper blade spoiler 20, the reinforcing elements 25, on the respectively outer boundary thereof on the side facing the subsegments 26, in each case have an edge 34, 35 which forms a mount for the respective end side of the subelement 26, and therefore the end sides of the subsegments 26 of the wiper blade spoiler 20 are covered by the edges 34, 35 of the respective reinforcing element 25, as can be seen with reference to FIGS. 1 and 2.

According to the invention, provision may likewise be made for the wiper blade 10 to be designed as what is referred to as an "Aqua Blade" wiper blade 10. In such a wiper blade 10, spray openings (not illustrated) are arranged on the longitudinal sides of the wiper blade 10, by means of which spray openings washing fluid can be applied by the wiper blade 10 in the wiping direction in each case in the direct vicinity of the vehicle window to be cleaned. For this purpose, provision is made, in the illustrated embodiment of the wiper blade 10, for a washing fluid duct 37, 38 to be formed in each case in the wiper blade spoiler 20 or in the subsegments 26 thereof on the two longitudinal sides of the wiper blade body 12 according to FIG. 4. The washing fluid ducts 37, 38 are supplied with washing fluid via the wiper blade adapter 11 in a manner which is likewise known per se, wherein a supply hose on the vehicle for the washing fluid is connected to the wiper blade adapter 11.

In order to connect the respective subsegments 26 of the wiper blade spoiler 20 and the washing fluid ducts 37, 38 thereof hydraulically to one another, the reinforcing elements 25 have through-bores 39 in alignment with the washing fluid ducts 37, 38, said through-bores being of elongated design on the mutually opposite end sides in the form of connecting pieces 41, 42, wherein the connecting pieces 41, 42 engage in the respective washing fluid ducts 37, 38 and thereby form a continuous duct for the washing fluid in the respective longitudinal side of the wiper blade 10.

In an alternative of the wiper blade 10 that is illustrated in FIG. 8, provision may be made for the spray openings, instead of being formed in the subsegments 26 of the wiper blade spoiler 20, to be formed in the reinforcing elements 25 themselves. For this purpose, a through-bore 43 which forms a spray opening 44 is formed in each case in the reinforcing element 25 on the two longitudinal sides of the wiper blade 10.

As explained, the torsional resistance of the wiper blade 10 can be influenced by the number of reinforcing elements 25 along the wiper blade body 12. Furthermore, the torsional resistance behaviour of the wiper blade 10 can also be influenced in a desired manner by the mutual spacing of the reinforcing elements 25 in the longitudinal direction of the wiper blade body 12. In addition, however, it is also possible to increase the torsional resistance or the deflection of the wiper blade body 12 transversely with respect to the extension thereof by means of at least one additional strip-shaped reinforcing element 45.

Analogously to the spring strips 18, 19, the additional reinforcing element 45 is preferably likewise designed as a spring strip 46 and, depending on the structural configuration, can at least partially take on the function of the spring strips 18, 19. The additional reinforcing element 45 may be of a length which corresponds to the length of the wiper blade body 12 or of the spring strips 18, 19. However, the additional reinforcing element 45 customarily has a shorter length, for example an overall length which corresponds approximately to half of the overall length of the wiper blade body 12. In this case, provision is likewise preferably made for the additional reinforcing element 45 to be arranged centrally with respect to the wiper blade adapter 11, which means that approximately half of the length of the additional reinforcing element 45 extends in each case on both sides of the wiper blade adapter 11.

As can best be seen with reference to FIG. 8, the additional reinforcing element 45 is received on the upper side of the wiper rubber 13 in a mount 47, which is U-shaped in cross section, of the reinforcing element 25, wherein the additional reinforcing element 45 rests in the mount 47 in order to form an assembly with the reinforcing element 25. In order to position the additional reinforcing element 45 and the spring strip 46 in the longitudinal direction with respect to the wiper blade adapter 11, provision may be made, according to FIG. 7, for, by way of example, two through-bores 48 to be formed in the spring rail 46, in which through-bores locking pins 49 of the wiper blade adapter 11 engage and therefore connect the spring strip 46 to the wiper blade adapter 11 by means of a form-fitting connection.

A further increase in the torsional resistance of the wiper blade body 12 or of the wiper blade 10 can be obtained by the use of a plurality of additional reinforcing elements 45 which are preferably arranged one above another in the manner of a leaf spring (not shown). By means of a corresponding configuration/pairing of the spring strips 18, 19 and of the additional spring strips 46, such an embodiment could advantageously produce a relatively high contact pressure force on the wiper blade tip regions without the contact pressure force in the central region of the wiper blade 10 having to be increased as a result.

The wiper blade 10 described to this extent and the reinforcing elements 25 thereof and the additional reinforcing element 45 thereof may be modified in diverse ways without departing from the concept of the invention.

LIST OF DESIGNATIONS 1 wiper arm
2 connecting region
10 wiper blade
11 wiper blade adapter
12 wiper blade body
13 wiper rubber
14 wiper lip
15 tilting web
16 receiving groove
17 receiving groove
18 spring strip
19 spring strip
20 wiper blade spoiler
21 end cap
22 arm
23 arm
24 mount
25 reinforcing element
26 subsegment
28 connecting region
29 retaining arm
30 retaining arm
31 mount
32 mount
34 edge
35 edge
37 washing fluid duct
38 washing fluid duct
39 through-bore
41 connecting piece
42 connecting piece
43 through-bore
44 spray opening
45 additional reinforcing element
46 spring strip
47 mount
48 through-bore
49 locking pin
b width
h height
M torque

The invention claimed is:

1. A wiper blade for the cleaning of vehicle windows, comprising:
a wiper blade body, which is able to be connected to a wiper arm via a wiper blade adapter arranged approximately centrally on the wiper blade body, wherein the wiper blade body has a wiper rubber with a wiper lip, and wherein a receiving groove which is U-shaped in cross section is formed and in which a strip-shaped spring strip engages in the wiper rubber on both longitudinal sides lying opposite each other, wherein the two spring strips are rigidly connected to each other by at least one reinforcing element, wherein the reinforcing element engages over the wiper blade body on the side facing away from the wiper lip and is connected directly to the two spring strips, wherein the reinforcing element has mounts, which are U-shaped in cross section, for the spring strips, which embrace the spring strips on the sides lying opposite the receiving grooves of the wiper rubber by a clamping fit, wherein the at least one reinforcing element consists of plastic and is constructed as an injection moulded part, wherein the wiper blade body forms a spoiler element on the side facing away from the wiper lip, and the cross section of the at least one reinforcing element is adapted to the spoiler element, wherein the at least one reinforcing element is arranged in each case on both sides of the wiper blade adapter, and wherein the at least one reinforcing element has at least one through-bore for a washing fluid, said through-bore extending parallel to the wiper blade body and being connected by at least one connecting piece to a washing fluid duct constructed in the spoiler element.

2. The wiper blade according to claim 1, wherein the reinforcing element has at least one spray opening for the washing fluid, which is connected to the through-bore.

3. The wiper blade according to claim 1, wherein at least one additional reinforcing element is provided, constructed as a spring strip, which connects the wiper blade adapter to the reinforcing element in a form-fitting manner.

4. The wiper blade according to claim 3, wherein the additional reinforcing element is arranged on the upper side of the wiper rubber.

5. The wiper blade according to claim 4, wherein the additional reinforcing element is received in a mount of the reinforcing element, and that the additional reinforcing element is positioned by a form-fitting connection to the wiper blade adapter in the longitudinal direction in the wiper blade body.

* * * * *